United States Patent [19]

Svensson

[11] 3,974,852
[45] Aug. 17, 1976

[54] HOSE RUPTURE VALVE

[75] Inventor: Torbjörn Svensson, Skelleftea, Sweden

[73] Assignee: Linden-Alimak AB, Skelleftea, Sweden

[22] Filed: Nov. 27, 1974

[21] Appl. No.: 527,617

[30] Foreign Application Priority Data
Nov. 30, 1973 Sweden .......................... 73162505

[52] U.S. Cl. .............................................. 137/498
[51] Int. Cl.² ................. F16K 17/24; F16K 31/363
[58] Field of Search ..................... 137/498, 504, 501

[56] References Cited
UNITED STATES PATENTS

| | | | |
|---|---|---|---|
| 2,478,211 | 8/1949 | Sprague et al. ................. | 137/498 X |
| 3,476,141 | 11/1969 | Tillman ............................. | 137/498 |
| 3,572,845 | 3/1971 | Johannesen ........................ | 137/498 |
| 3,756,272 | 9/1973 | Hammond .......................... | 137/498 |

FOREIGN PATENTS OR APPLICATIONS

| | | | |
|---|---|---|---|
| 1,176,371 | 5/1957 | France ............................. | 137/504 |
| 816,212 | 7/1959 | United Kingdom ................ | 137/504 |

*Primary Examiner*—Martin P. Schwadron
*Assistant Examiner*—Robert J. Miller

[57] ABSTRACT

The valve is adapted to close against the force of a bias spring in response to a substantial increase in the pressure drop through restricted by-pass passages in the valve when a hose is ruptured on the outlet side of the valve. The restriction of the by-pass passages is adjustable by rotation of an internal adjustment ring to thereby determine the flow rate at which the valve is actuated.

6 Claims, 5 Drawing Figures

HOSE RUPTURE VALVE

The present invention relates to a fluid pressure responsive valve which is particularly useful in fluid pressure lines for pneumatic machinery, and which is operable to close upon rupture of a hose connected to the outlet end of the valve.

The valve consists of a housing having between an inlet and an outlet a perforated disc which is arranged substantially transversally of the flow direction of the fluid and normally spring biased in a direction towards the inlet of the valve into abutment against a stop device. The housing includes by-pass passages through which the fluid can pass between the outer circumference of the disc and the internal surface of the housing. The disc is operable in response to a pressure drop above a predetermined limit across said by-pass passages for movement against the spring bias in a direction towards the outlet of the housing into abutment against a peripheral seat surrounding and defining a flow cross section in the valve which is smaller than the area of the disc to thus close the valve.

A hose rupture valve is mainly used in mines, wherein air operated tools and machines are utilized to a great extent. When a rupture occurs in a line the pressure reduction across the disc due to the increased air velocity is so large that the spring pressure is exceeded and the disc closes against the valve seat. When the rupture is repaired, the air flowing through the small hole in the disc is sufficient to build up the pressure at the outlet side and the valve will open again automatically.

Due to varying line lengths and variations of the air consumption, the valve must be adjusted as a rule at each location. In prior valves, this adjustment is performed by changing the valve spring force, requiring that the valve be disconnected from the line. This work is time-consuming and therefore the adjustment is often neglected, which imperils the proper operation of the valve.

An object of the present invention is to provide a valve structure, by means of which it is possible to adjust the valve in a substantially simpler manner and without requiring disconnection of the valve. This object has been attained by making the flow cross section of the by-pass passages variable.

One embodiment of the valve according to the invention shall now be described in more detail with reference to the attached drawings, in which.

Figure 1:
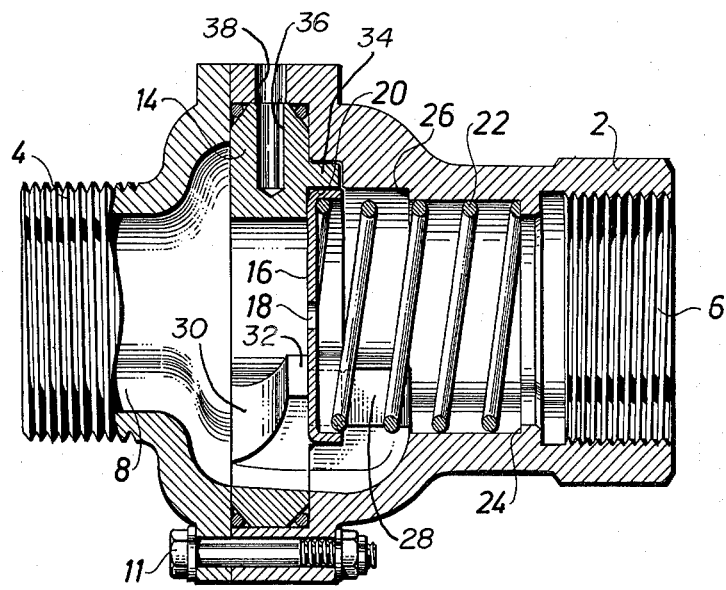
FIG. 1 shows a side view, partially in axial section through the valve.

The valve illustrated in the drawings comprises a housing composed of two parts 2 and 4. The part 2 contains the outlet 6 of the valve and the part 4 the inlet 8 thereof. At the inlet and outlet members there are provided female and male screw threads for connection of the valve in series into a pressure fluid line.

Figure 2:
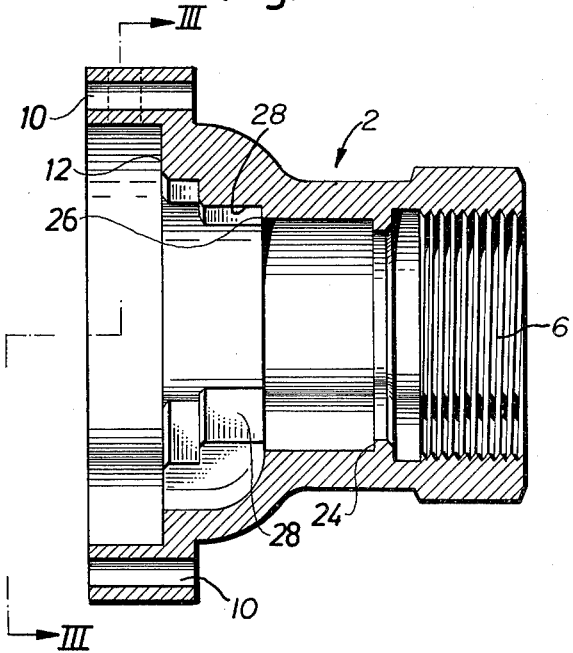
FIG. 2 shows an axial section through a part of the valve housing.

As illustrated in FIG. 1 and FIG. 2, the part 2 is cup shaped, and at the wider end thereof remote from the outlet 6, it includes peripheral bolt holes 10. The part 4 comprises corresponding bolt holes, and is connected with the part 2 by means of bolt connections 11.

Between the inner end of part 4 and an internal shoulder 12 of the part 2 an adjustment ring 14, described more fully below, is confined. The adjustment ring 14 serves as a stop for a circular restriction disc 16 perforated with a central small hole 18 and having an outer edge flange 20. The restriction disc 16 is biased against the adjustment ring 14 by means of a helical spring 22. The other end of spring 22 remote from the restriction disc abuts an internal shoulder 24 in the housing part 2. The housing part 2 in addition comprises an internal shoulder 26 turned towards the restriction disc 16 and adapted to cooperate, in a manner described more fully below, with the edge flange 20 of the restriction disc 16 so as to close the valve.

Figure 3:
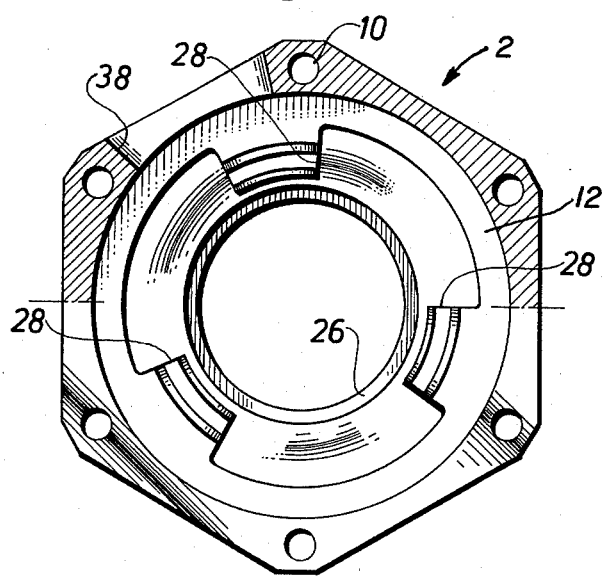
FIG. 3 is an end view, partially in cross section, at the plane indicated at III—III in FIG. 2.
Figure 4:
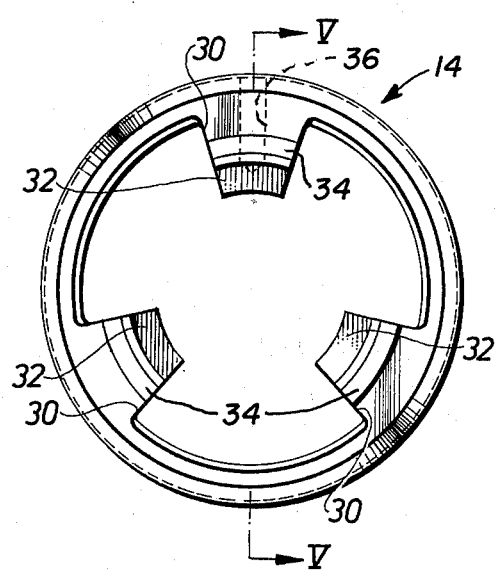
FIG. 4 is an axial end view of an adjustment ring included in the valve.
Figure 5:
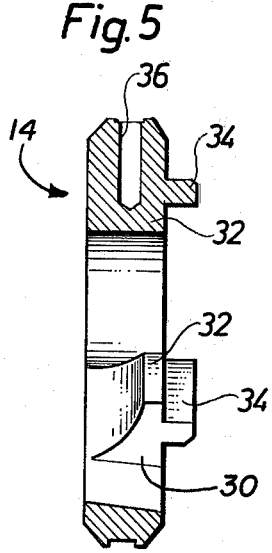
FIG. 5 is a section view of the ring through the plane indicated at V—V in FIG. 4.

Between the internal shoulders 12 and 26, the housing part 2 includes three circumferentially equally spaced and radially inwardly projecting extensions 28, the shape and location of which is evident from FIGS. 2 and 3. Referring to FIGS. 4 and 5, the ring 14 has similar radially inwardly directed extensions 30, the end portions 32 of which serve as the stop seat for the restriction disc 16. Extensions 34 projecting axially from the extensions 30, are arranged for centering the restriction disc.

The outer circumferential edge of the restriction disc 16 together with the radial extensions 30 of the adjustment ring 14, the radial housing extensions 28, and the internal wall of the housing part 2 define three restricted by-pass passages for the pressure fluid flow from the inlet 8 to the outlet 6. When rupture occurs in a line connected to the outlet the pressure reduction across the restriction disc will become so great, due to the increased pressure fluid velocity, that the spring pressure of the helical spring 22 is exceeded and the disc is caused to move to the closed position with the edge flange 20 against the shoulder 26 in the housing part 2. When the line on the outlet side of the valve is closed, the pressure fluid will flow through the small hole 18 in the center of the restriction disc, and when the pressure at the outlet side has been built up to a certain value, the valve will open automatically by the restriction disc 16 being forced by spring 22 to abut the adjustment ring 14.

In the position of the ring 14 illustrated in FIG. 1, the radial extensions 30 of the ring 14 and the radial housing extensions 28 are in rotational alignment with one another to provide the maximum opening of the restricted by-pass passages around the edges of disc 20. However, the flow cross section of the by-pass passages may be varied by rotating the adjustment ring 14 so that the radial extensions 30 thereof are caused to move out of rotational alignment with radial extensions 28 to thus cover a larger or smaller portion of the space between the radial extensions 28. This adjusts the minimum fluid flow rate through the by-pass passages at which disc 16 is actuated to close the valve.

In order to provide for rotation of the adjustment ring 14, the ring has a bore 36 at the periphery thereof, and extending a distance into one of the extensions 30, into which an actuating member, in the form of a pin (not shown), may be inserted via a slot 38 in the wall of the housing part 2.

Consequently, the position of the adjustment ring may be controlled in a simple manner from the exterior thereof, and this can be done without disconnecting the valve from the line in which it has been installed.

The present invention is not restricted to the embodiment described above and illustrated in the drawings, but may be modified within the scope of the following claims.

What I claim is:

1. A hose rupture valve adapted to be located in a pressure fluid line and comprising
a housing having inlet and outlet openings,
a perforated flow restriction disc arranged within said housing substantially transversely of the flow direction of the pressure fluid through said housing between said inlet and outlet openings,
a spring normally biasing said disc in a direction towards said inlet opening,
said housing including a stop device for limiting the spring biased movement of said disc,
said housing defining restricted by-pass passages around the outer peripheral edges of said disc,
said disc being movable against the force of said biasing spring in a direction towards said outlet opening into abutment against a peripheral seat defined within said housing which surrounds and defines a flow cross section in the valve which is smaller than the area of said restriction disc to thereby close said valve in response to the condition when the inlet pressure exceeds the outlet pressure by more than a predetermined limit which is normally exceeded upon rupture of a hose connected to said outlet opening,
said valve housing including means for adjustably varying the cross section of said by-pass passages to thereby determine the fluid flow rate through said by-pass passages at which the inlet pressure exceeds the outlet pressure by said predetermined limit to move said disc and close said valve,
said means for adjustably varying the cross section of said by-pass passages comprising a blocking member which is movable in a plane extending transversely of the flow direction of the pressure medium to adjustably block the by-pass passages more or less in response to the transverse movement thereof.

2. A valve as claimed in claim 1 wherein
said housing includes an annular groove in the internal wall thereof,
and said blocking member comprises a ring rotatably positioned within said annular groove,
said ring having circumferentially spaced radially inwardly directed extensions to restrict the area of said by-pass passages,
said housing including a plurality of radially inwardly directed extensions at circumferentially spaced positions therein for restricting and defining said by-pass passages,
said radially inwardly directed extensions of said ring being axially spaced from and cooperable with said radially inwardly directed extensions from the internal wall of said housing to define said by-pass passages in accordance with the rotational position of said ring to determine the degree of restriction of said by-pass passages by said blocking member.

3. A valve as claimed in claim 2 wherein
said disc stop device is combined with said ring and said radially inwardly directed extensions of said ring include surfaces to be engaged by said restriction disc to provide the disc stop device function for limiting the spring-biased movement of said disc.

4. A valve as claimed in claim 2 wherein
said radially inwardly directed extensions of said ring are operable to be placed in rotational alignment with said radially inwardly directed extensions from the internal wall of said housing when the minimum restriction of said by-pass passages is required.

5. A valve as claimed in claim 2 wherein
said housing includes a slot in the wall thereof extending in parallel with the plane of said ring and exposing said ring for access from the exterior of said housing for rotational adjustment of said ring, and wherein
the portion of the periphery of said ring exposed by said slot in the wall of said housing includes an opening for the insertion of a tool for rotation of said ring.

6. A valve as claimed in claim 2 wherein
said housing comprises two separable parts and said ring is assembled between said separable parts.

* * * * *